US006539842B1

United States Patent
Chapman et al.

(10) Patent No.: US 6,539,842 B1
(45) Date of Patent: Apr. 1, 2003

(54) ROTISSERIE SYSTEM HAVING A REMOTE TEMPERATURE MONITOR

(75) Inventors: Peter A. Chapman, Avon by the Sea, NJ (US); Darren Keller, Easton, PA (US); Hughes Sanoner, Hong Kong (HK)

(73) Assignees: Maverick Industries, Inc., Edison, NJ (US); Solar Wide Industrial Ltd., Hong Kong (HK)

( * ) Notice: Subject to any disclaimer, the term of this patent is extended or adjusted under 35 U.S.C. 154(b) by 0 days.

(21) Appl. No.: 10/200,100

(22) Filed: Jul. 19, 2002

(51) Int. Cl.[7] .................... A47J 37/00; A47J 37/04; A47J 43/00
(52) U.S. Cl. .................... 99/342; 99/419; 99/421 TP; 374/155; 374/160
(58) Field of Search ................ 99/342–344, 419–421 V, 99/337, 338, 331; 374/155, 153, 158, 160, 117, 147, 208; 116/216–218, 281, 283, 101, 106; 294/907, 49, 55.5

(56) References Cited

U.S. PATENT DOCUMENTS

| | | | |
|---|---|---|---|
| 2,132,095 A | * 10/1938 | Broughton | ............... 99/421 R |
| 2,189,123 A | 2/1940 | Barker | |
| 2,787,948 A | 4/1957 | Mathis | |
| 2,898,845 A | 8/1959 | Dight | |
| 3,075,454 A | 1/1963 | Henyan | |
| 3,108,532 A | * 10/1963 | Ray et al. | .................... 374/160 |
| 3,140,611 A | * 7/1964 | Kliewer | .................. 99/421 TP |
| 3,479,876 A | * 11/1969 | Kliewer | .................... 99/419 X |
| 3,511,167 A | 5/1970 | Holtkamp | |
| 3,552,210 A | 1/1971 | Wright, Jr. | |
| 3,709,141 A | * 1/1973 | Schwartzstein | ............... 99/343 |
| 3,967,502 A | * 7/1976 | Moran | ....................... 99/343 X |
| 4,059,997 A | * 11/1977 | Tott | ........................... 374/155 |
| 4,089,222 A | * 5/1978 | Perkins | ......................... 99/344 |
| 4,237,731 A | * 12/1980 | Dehn | ...................... 374/155 X |
| 4,381,439 A | * 4/1983 | Miyazawa et al. | ....... 99/421 TP |
| 4,966,125 A | 10/1990 | Stephen et al. | |
| 5,312,188 A | * 5/1994 | Ashe | ........................... 374/155 |
| 5,622,137 A | 4/1997 | Lupton, Jr. et al. | |
| 5,634,719 A | 6/1997 | La Neve | |
| 5,983,783 A | 11/1999 | Archard et al. | |
| 5,988,102 A | * 11/1999 | Volk et al. | .................. 116/218 |
| 6,000,845 A | 12/1999 | Tymkewicz et al. | |
| 6,065,391 A | 5/2000 | Archard et al. | |
| 6,220,152 B1 | 4/2001 | Baldwin et al. | |
| 6,272,975 B1 | 8/2001 | Usherovich | |
| 6,279,462 B1 | 8/2001 | Kim | |
| 6,412,398 B1 | * 7/2002 | Norcross et al. | ............... 99/342 |

* cited by examiner

Primary Examiner—Timothy F. Simone
(74) Attorney, Agent, or Firm—Lerner, David, Littenberg, Krumholz & Mentlik, LLP

(57) ABSTRACT

A rotisserie system includes a rotatable skewer adapted to secure meat, the rotatable skewer including a temperature sensor for recording a temperature of the meat and a wireless transmitter for wirelessly transmitting the temperature. The system also includes a remote temperature monitor having a wireless receiver for receiving the wirelessly transmitted temperature and a visual display for displaying the temperature, whereby the remote temperature monitor is movable away from the rotatable skewer while remaining in wireless communication with the wireless transmitter to enable an operator to continuously monitor the cooking temperature of the meat. The wireless transmission and reception may be accomplished using infrared light or radio frequency waves.

20 Claims, 9 Drawing Sheets

ROTISSERIE SYSTEM HAVING A REMOTE TEMPERATURE MONITOR

BACKGROUND OF THE INVENTION

The present invention is generally directed to cooking and is particularly directed to rotisserie cooking systems.

A rotisserie is a cooking device having a rotating spit on which meat is skewered and then continuously rotated during cooking. One of the long-standing problems with rotisseries has been an inability to obtain accurate temperature readings for the meat being roasted. This is due, in part, to the fact that the meat must be continuously rotated during cooking. The constant motion makes it difficult to obtain a temperature reading. In response to this problem, there have been a number of efforts directed to obtaining temperature readings for rotisserie-cooked foods.

U.S. Pat. No. 3,511,167 to Holtkamp discloses a cooking oven having a rotisserie spit with a temperature probe provided for insertion into meat and a cable connecting the probe to a temperature responsive device in a wall of an oven. The direct connection by cable between the meat on the rotisserie spit and a fixed receptacle in the wall of the oven precludes continuous rotation of the spit and the meat skewered on the spit. Holtkamp provides a mechanism between a rotisserie spit motor and the spit itself that converts the rotary motion of the motor into oscillating motion of the spit. The spit oscillates through an arc of about 100° to 540°, making it possible to use a meat probe connected to an oven receptacle by a cable of limited length.

U.S. Pat. No. 4,075,454 to Henyan discloses a thermometer support for a rotisserie whereby a thermometer is insertable into a body of meat or other food disposed on a spit. The rotisserie has a bracket with an upstanding tongue provided with an aperture adapted to receive a portion of the thermometer.

U.S. Pat. No. 2,898,845 to Dight discloses a combination skewer and thermometer designed to adequately support a roast in a desirably revolving arrangement, and at the same time, has a centrally disposed heat-sensing device, such as a metallic thermometer. The heat-sensing device may be placed at the center of the roast for obtaining internal temperature readings for the roast.

U.S. Pat. No. 2,787,948 to Mathis discloses a rotary spit thermometer having a built-in device for indicating when meat has been cooked to a desired temperature. The rotary spit assembly includes a hollow shaft insertable through the center of a piece of meat, with a temperature sensitive element arranged in the interior of the shaft. The rotary spit shaft may be driven by an electric gear motor placed at the rear of an oven.

One problem with the prior art advances described above is that an operator must remain close to the oven or barbecue grill used to cook the meat. As a result, an operator is not free to move away from the cooking location while maintaining continuous temperature monitoring of the item being cooked. This is particularly important for gourmet cooking where cooking to exacting temperatures is highly desirable. Another problem with the prior art is that an operator must frequently open the oven or barbecue grill to obtain the latest temperature readings, which may abruptly change the temperature inside the oven or grill. Rapid temperature changes may adversely affect the cooking operation.

SUMMARY OF THE INVENTION

In accordance with certain preferred embodiments of the present invention, a rotisserie system includes a rotatable spit adapted to secure meat, the rotatable spit including a temperature sensor for recording a temperature of the meat and a wireless transmitter for wirelessly transmitting the recorded temperature. The rotisserie system also preferably includes a remote temperature monitor including a wireless receiver for receiving the wirelessly transmitted temperature and a visual display for displaying the temperature, whereby the remote temperature monitor is movable away from the rotatable spit while remaining in wireless communication with the wireless transmitter of the spit. The wireless transmitter is preferably an infrared transmitter or a radio frequency transmitter and the wireless receiver is preferably an infrared receiver or a radio frequency receiver.

In certain preferred embodiments, the rotatable spit has a pointed end for skewering meat, a handle end and a shaft extending between the pointed end and the handle end. The rotatable spit also preferably includes one or more electrical contacts accessible at an outer surface of the shaft. The rotisserie system also preferably includes a sensor ring securable over the spit shaft, the sensor ring includes a contact plate engagable with the one or more contacts of the spit shaft for forming an electrical interconnection between the sensor ring and the spit shaft. The sensor ring also preferably includes two or more hollow fork fingers, whereby one of the two or more hollow fork fingers includes a temperature sensor such as a thermistor. In certain preferred embodiments the sensor ring may have four fork fingers that are the rotisserie system may also include a conductive line having a first end connected to the temperature sensor and a second end connected to the contact plate of the sensor ring.

In certain preferred embodiments, the one or more contacts accessible at the outer surface of the spit shaft include a plurality of contacts. In other preferred embodiments, the plurality of space contacts are evenly spaced from one another along the spit shaft. The sensor ring can be placed anywhere along the length of the shaft as long as the sensor ring is in electrical contact with one of the spaced contacts.

The sensor ring may also include a rotatable locking screw adapted for locking the sensor ring in place at a selected location along the length of the spit shaft. When tightened, the locking screw preferably precludes rotary and lateral movement of the sensor ring relative to the spit shaft.

The remote temperature monitoring unit preferably includes data entry keys for selecting one of a plurality of meats for temperature monitoring and a visual display for displaying cooking information related to the temperature readings received by the wireless receiver. The remote temperature monitor may also include a memory for storing cooking data related to the plurality of meats and doneness temperature ranges associated with each of the plurality of meats. The doneness temperature ranges may include temperature ranges for well, medium, medium rare and rare doneness levels. Subroutines for selecting meats and doneness levels for the meats are disclosed in commonly assigned U.S. patent application Ser. No. 09/563,813, filed May 3, 2000, the disclosure of which is hereby incorporated by reference herein.

In other preferred embodiments of the present invention, a rotisserie system includes a rotatable spit having a shaft with an outer surface and a plurality of spaced contact pads accessible at the outer surface of the shaft. The rotisserie system also preferably includes a sensor ring including two or more fork fingers projecting therefrom, a temperature sensor in one of the fork fingers, and a contact plate in communication with the temperature sensor, wherein the sensor ring is securable on the shaft in engagement with one of the contact pads so that the contact plate of the sensor ring is in electrical contact with one of the contact pads.

These and other preferred embodiments of the present invention will be described in more detail below.

BRIEF DESCRIPTION OF THE DRAWINGS

FIGS. 7A and 7B show respective left and right side views of the remote temperature monitor of FIGS. 6A and 6B.

DETAILED DESCRIPTION

Figure 1:
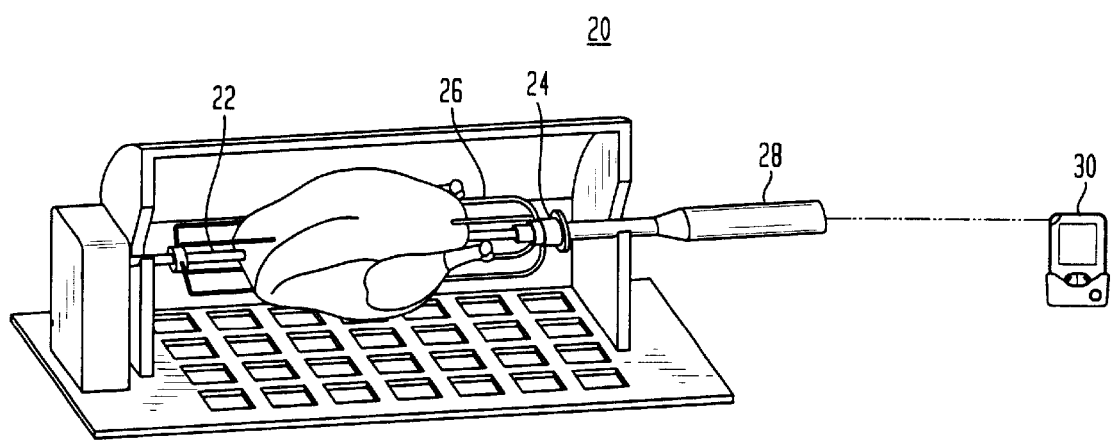
FIG. 1 shows a perspective view of a rotisserie system having a remote temperature monitor, in accordance with certain preferred embodiments of the present invention.

FIG. 1 shows a rotisserie system 20 of the present invention including a rotatable spit 22 with one or more sensor rings 24 attached thereto. Each sensor ring 24 has one or more fork fingers 26 projecting therefrom. The rotisserie system 20 also includes a handle 28 having one or more control buttons thereon and a remote temperature monitor 30 that is in signal-receiving communication with handle 28. As will be described in more detail below, during a cooking operation, temperatures obtained by one of the fork fingers 26 are transmitted by conductive lines through spit 22 to handle 28. The temperature reading is then wirelessly transmitted from handle 28 to remote temperature monitor 30. The wireless transmission preferably occurs through either infrared signals or radio frequency.

Figure 2:
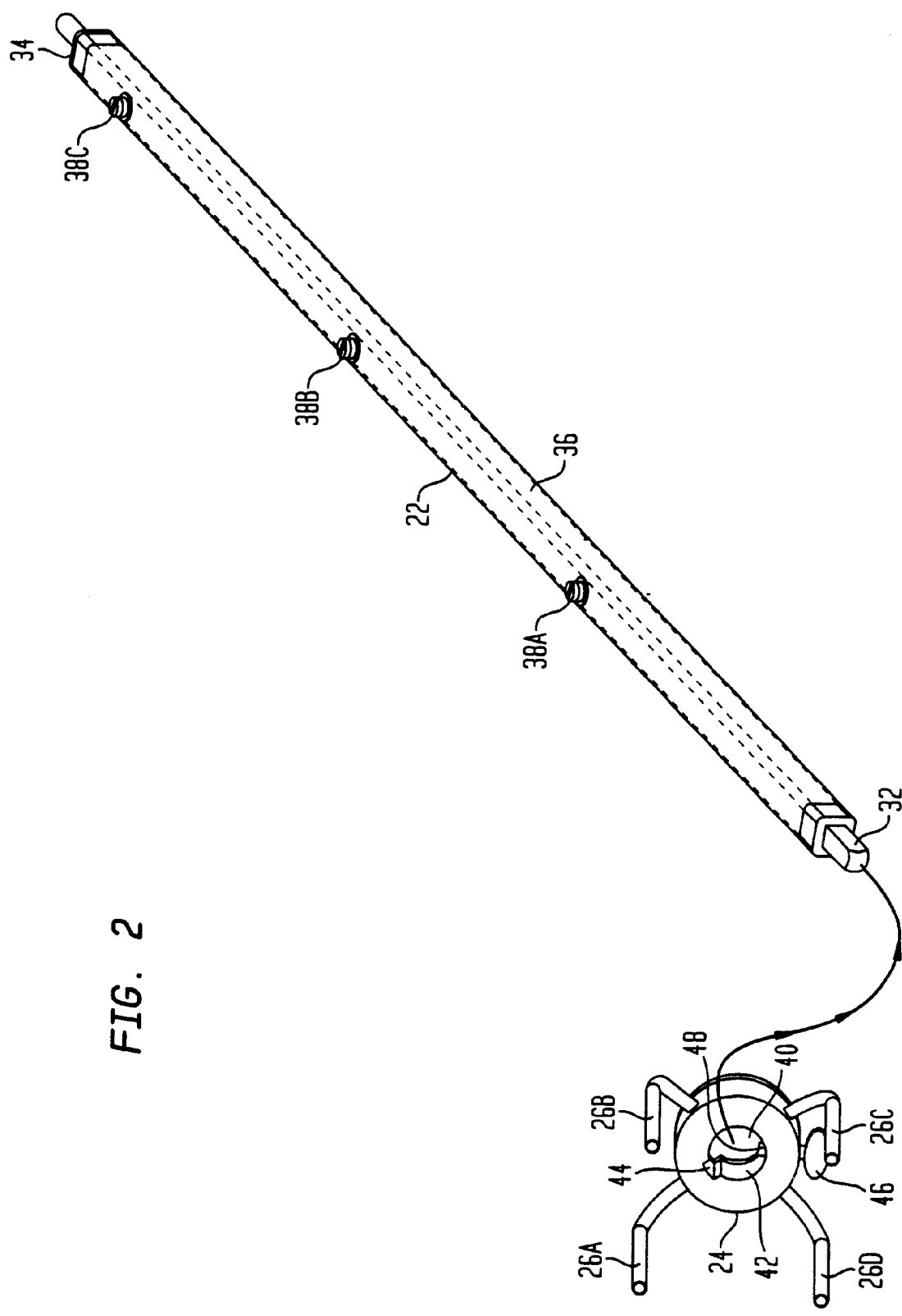
FIG. 2 shows a perspective view of a rotatable spit and sensor ring of the rotisserie system of FIG. 1.

FIG. 2 shows rotatable spit 22 before sensor ring 24 is secured thereto. Rotatable spit 22 includes a pointed end 32, a handle end 34 and a shaft 36 that extends between the pointed end 32 and the handle end 34. A series of contacts 38a, 38b and 38c are spaced along the length of shaft 36 between pointed end 32 and handle end 34. The contacts 38a–c are preferably evenly spaced from one another. In preferred embodiments, the rotatable spit 22 is made of heat conductive materials, such as metal.

The sensor ring 24 preferably includes a central opening 40 defined by annular wall 42. The central opening also includes a key slot 44 adapted to receive one of the spit contacts 38a–38c. The sensor ring 24 also includes a plurality of hollow fork fingers 26a–26d. At least one of the hollow fork fingers 26a–26d preferably includes a temperature probe such as a thermistor (not shown). The sensor ring 24 also includes a locking screw 46 for locking the sensor ring to the rotating spit. The locking screw 46 preferably includes a distal end 48 that may be screwed into aperture 40 for locking the sensor ring in a stationary position relative to spit shaft 36.

Figure 3:
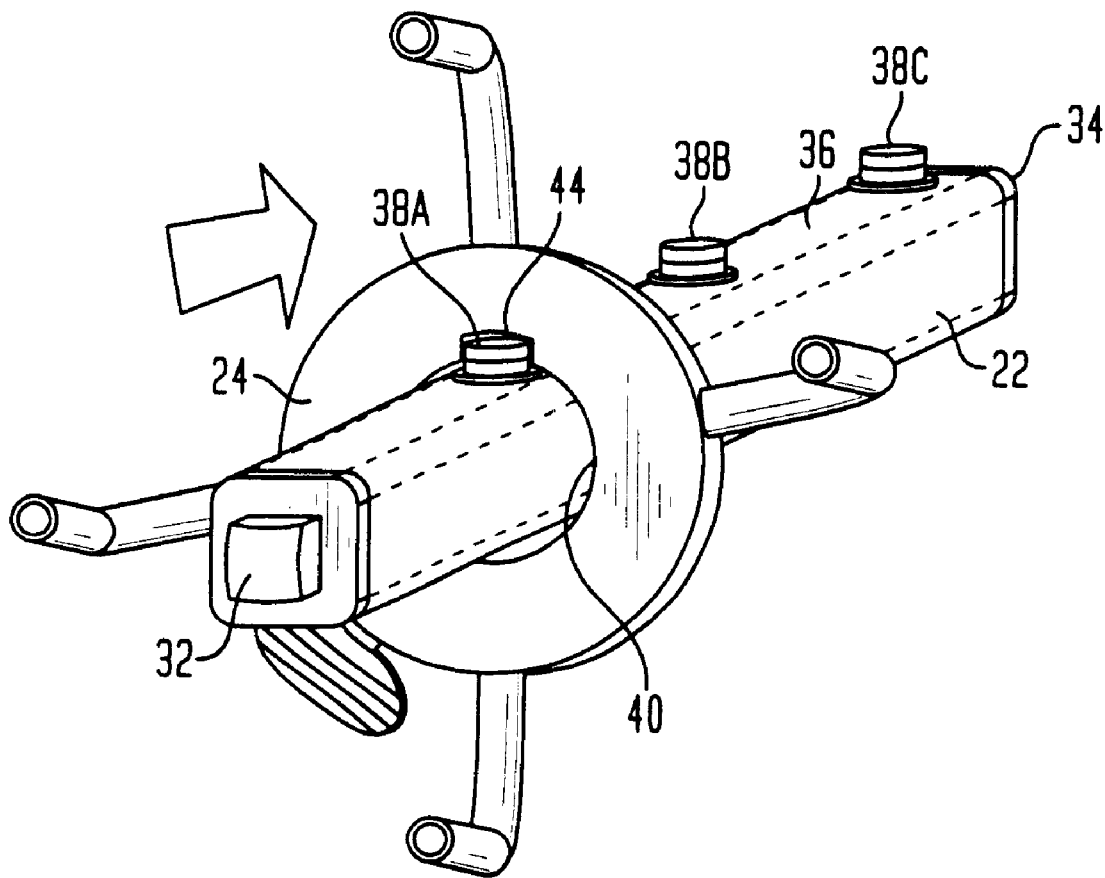
FIG. 3 shows the sensor ring and spit of FIG. 2 partially assembled together.

Referring to FIGS. 2 and 3, sensor ring 24 is assembled with spit 22 by passing pointed end 32 of spit 22 through sensor ring aperture 40. The sensor ring 24 may be secured at a plurality of positions along the length of spit shaft 36. In certain preferred embodiments, the sensor ring 24 may be secured to the spit shaft 36 in engagement with one of the three contacts 38a, 38b or 38c.

Figure 4:
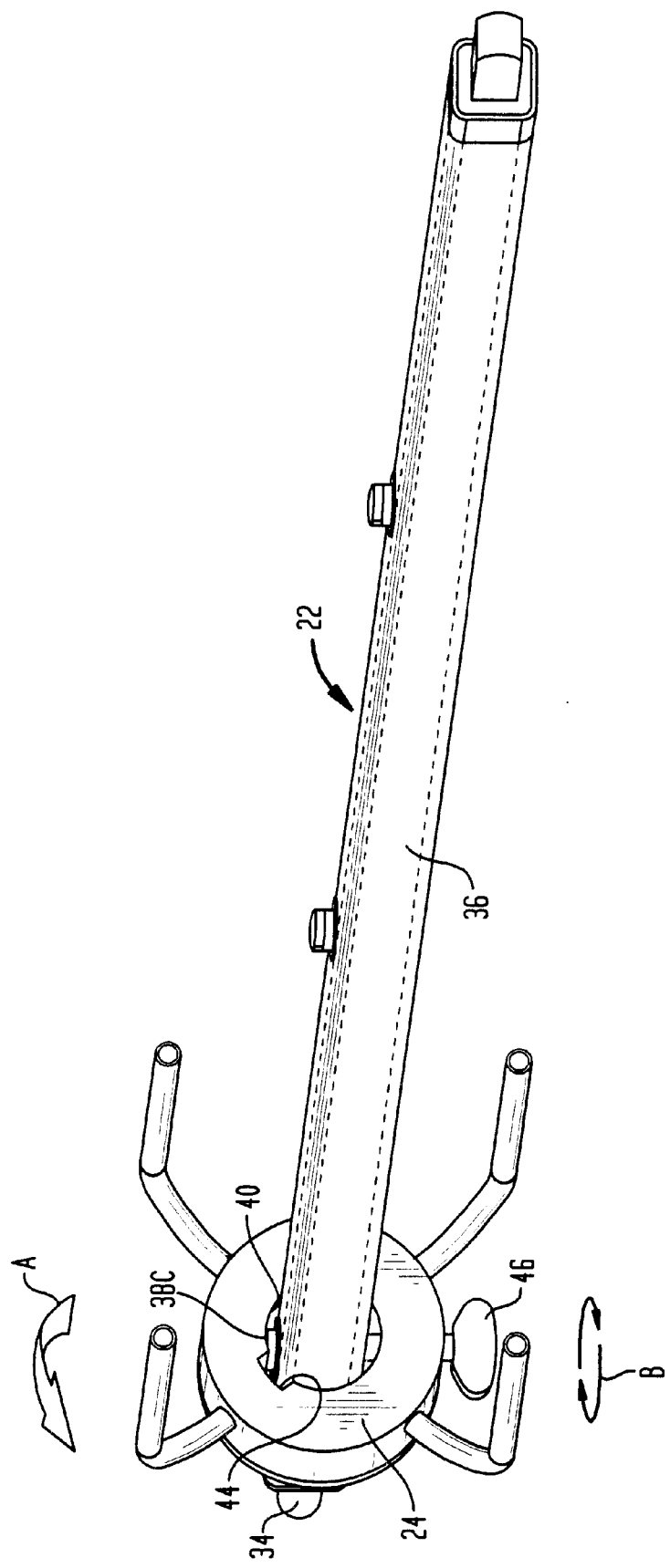
FIG. 4 shows the sensor ring and spit of FIG. 2 during a further assembly step.

Referring to FIG. 4, in one preferred embodiment, sensor ring 24 is moved toward handle end 34 of shaft 36 until key slot 44 is aligned with third sensor 38c. The sensor ring 24 is then rotated in a counterclockwise direction designated by arrow "A" until the third sensor 38c contacts the annular wall (not shown) surrounding aperture 40. The engagement of the sensor 38c with the annular wall of sensor ring 24 creates an electrical connection between contact 38c and sensor ring 24 so that temperature signals may pass between sensor ring 24 and spit 22. Once the sensor ring 24 is in electrical communication with third contact 38c, the locking screw 46 is rotated in a direction indicated by arrow "B" for preventing further movement of the sensor ring 24 relative to spit shaft 36.

Figure 5:
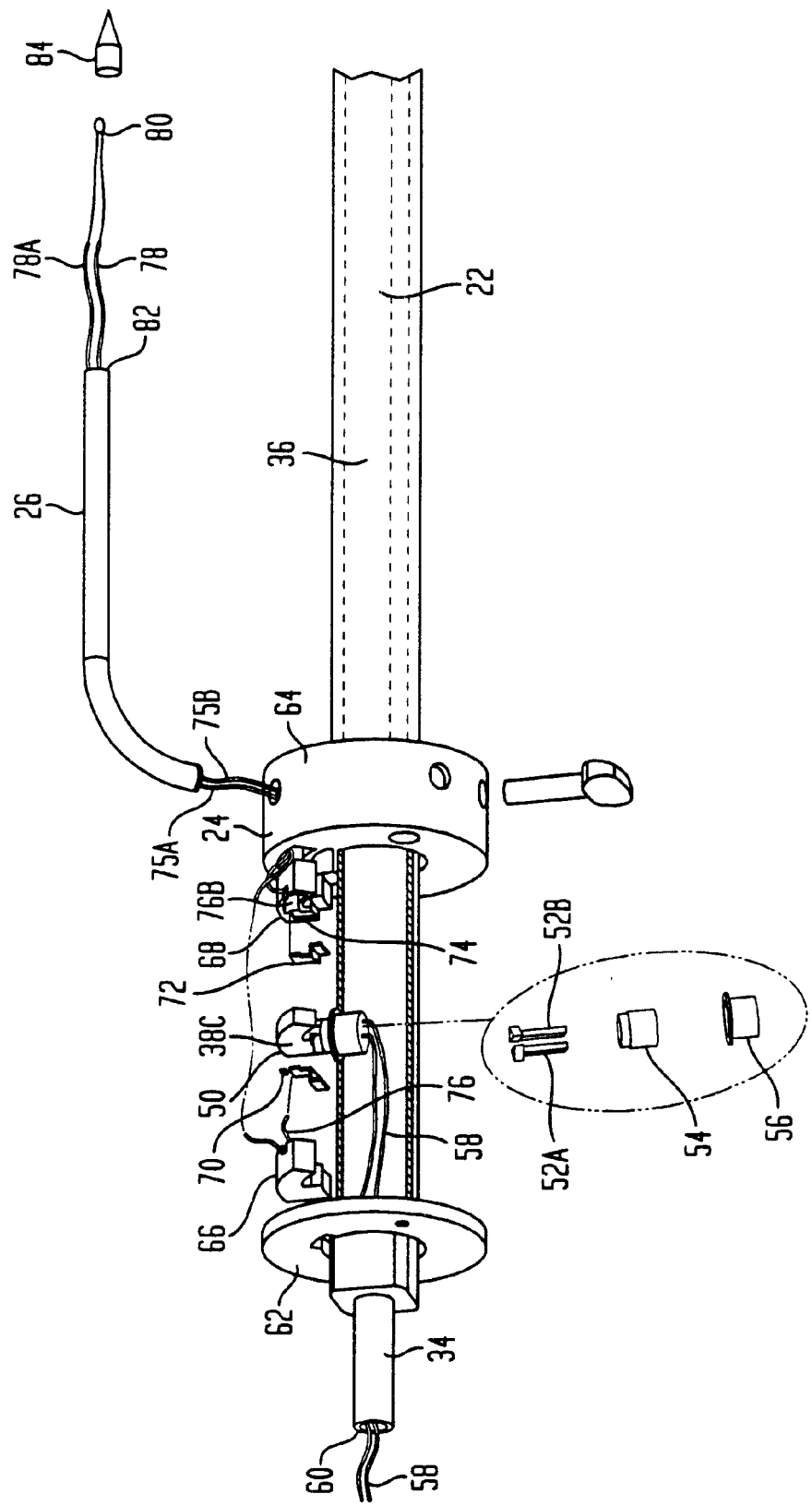
FIG. 5 shows an exploded view of the sensor ring and a partial cross-sectional view of the rotatable spit of FIG. 2, in accordance with certain preferred embodiments of the present invention.

FIG. 5 shows a partially exploded view of the sensor ring 24 shown in FIGS. 2–4 and a partial cross-sectional view of spit 22. Spit 22 includes sensor 38c having a pair of lower contacts 52a, 52b, a ceramic insulator 54 and a S.S. container 56. A pair of conductive wires 58 are connected to the lower contacts 52a, 52b. The conductive wires 58 pass through an opening 60 at the handle end 34 of spit shaft 36. The conductive wires 58 carry temperature signals to the handle (not shown).

The sensor ring 24 includes a cover 62 that is assembled with a main body 64. Sandwiched between cover 62 and main body 64 are ceramic insulators 66, 68 that are assembled together. A first contact plate 70 is secured to first ceramic insulator 66 and a second contact plate 72 is secured in recess 74 of second ceramic insulator 68. When the sensor ring 24 is secured to skewer shaft 36, the first and second contact plates 70, 72 engage lower contacts 52a, 52b for creating an electrical connection between sensor ring 24 and conductive lines 58.

The sensor ring 24 also includes temperature transmitting lines 75a, 75b having first ends 76a, 76b attached to the respective contact plates 70, 72 and second ends 78a, 78b connected to thermistor 80. The thermistor 80 is disposed within one of the hollow fork fingers 26. The open end 82 of fork finger 26 is closed by pointed cap 84. In operation, temperature readings obtained by thermistor 80 are passed through temperature communication line 75a, 75b to contact plates 70, 72. The temperature signals are then transmitted to contacts 52a, 52b and onto communication lines 58. The communication lines 58 carry the temperature signals to handle (not shown) which includes internal electronic circuitry for receiving the temperature signals and wirelessly transmitting the temperature signals to a remote temperature monitor.

Figure 6A:
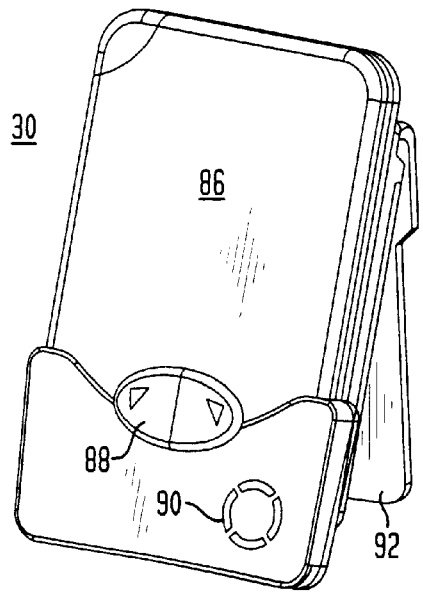
FIGS. 6A and 6B show perspective views of a remote temperature monitor for a rotisserie system, in accordance with certain preferred embodiments of the present invention.
Figure 6B:
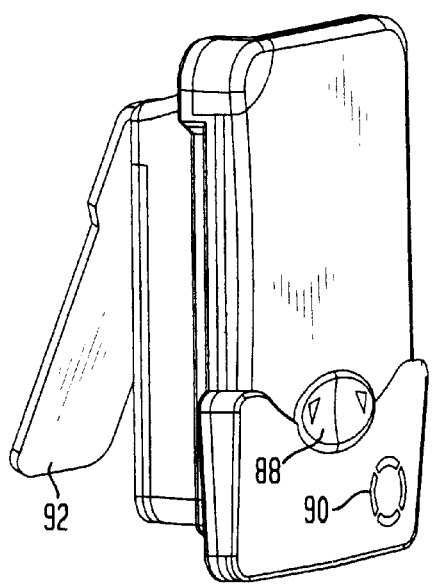
Figure 6C:
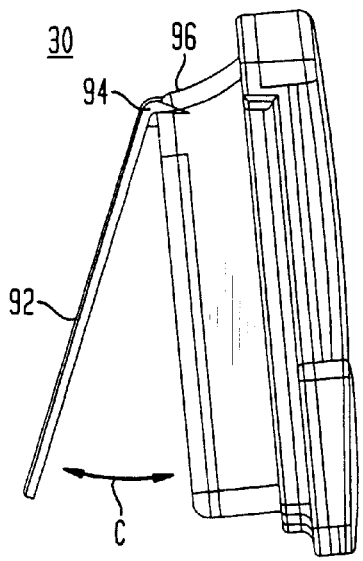
Figure 6D:
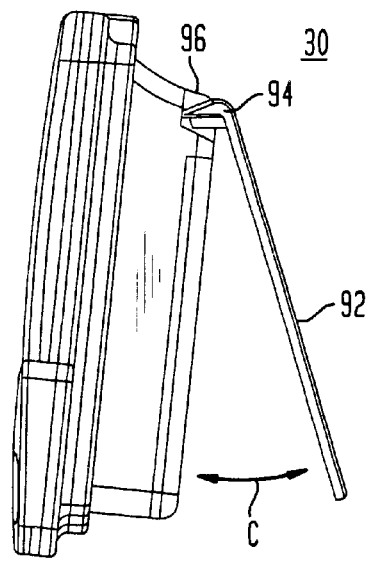

FIGS. 6A and 6B show a remote temperature monitor 30 including a front face 86, one or more data entry keys 88, a speaker 90 for emitting sound, and an adjustable stand 92 adapted for holding the remote temperature monitor 30 in upright orientation.

FIGS. 7A and 7B show respective left and right side views of the remote temperature monitor 30. Stand 92 includes an upper end 94 hingedly secured to a rear portion 96 of remote temperature monitor 30. The stand 92 may be swung back and forth in the directions indicated by arrow "C" to move the stand between a closed position and an open position shown in FIGS. 7A and 7B.

Figure 8:
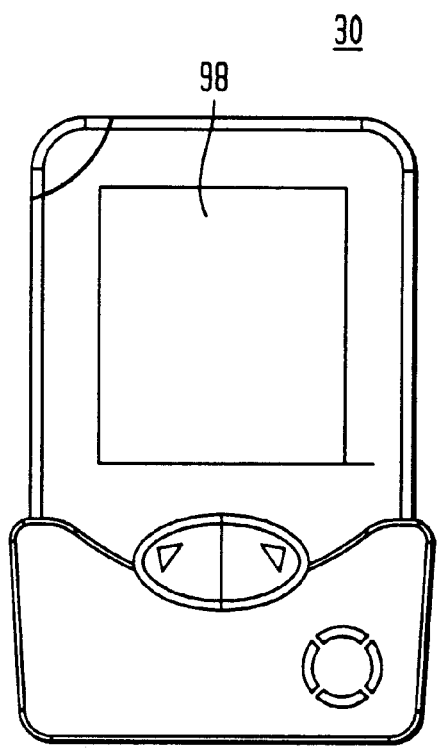
FIG. 8 shows a front elevational view of the remote temperature monitor of FIG. 6A, including a display screen.

Referring to FIG. 8, remote temperature monitor 30 includes a display screen 98 for displaying cooking information, as will be described in more detail below.

Figure 9:
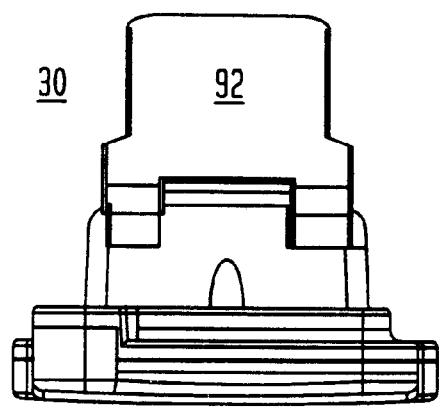
FIG. 9 shows a top view of the remote temperature monitor of FIG. 6A.

FIG. 9 shows a top view of remote temperature monitor 30 including hingedly connected stand 92 in the open position for holding the remote temperature monitor in an upright position.

Figure 10:
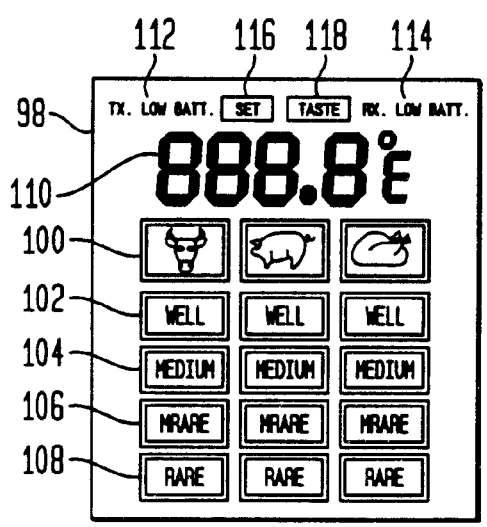
FIG. 10 shows the display screen of the remote temperature monitor of FIG. 8, in accordance with certain preferred embodiments of the present invention.

FIG. 10 shows the visual display 98 of the remote temperature monitor, in accordance with certain preferred embodiments of the present invention. Visual display 98 preferably includes food select indicators 100 that show the particular meat selected for temperature monitoring, such as indicators for beef, pork and poultry. Doneness indicators are provided under each of the selected food indicators. In preferred embodiments, each food has a "well done" indicator 102, a "medium" indicator 104, a "medium rare" indicator 106 and "rare" indicator 108. The visual display 98 also includes a temperature display 110 capable of displaying temperature readings in either Fahrenheit or Celsius, a low battery indicator 112 for the rotatable spit 22, and a low battery indicator 114 for the remote temperature monitor 30. The visual display 98 also preferably includes a set indicator 116 for indicating whether a final desired cooking temperature has been selected and a taste indicator for indicating whether a taste preference has been selected (e.g. well done).

Figure 11:
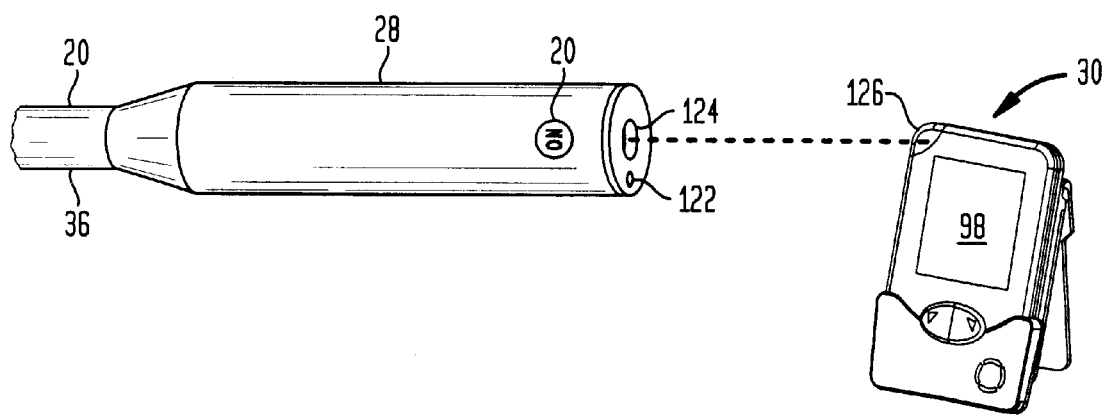
FIG. 11 shows a fragmentary view of the rotisserie system of FIG. 1 including a handle having an infrared light and a remote temperature monitor having an infrared sensor.

FIG. 11 shows the rotisserie system 20 of the present invention including handle 28 and remote temperature monitor 30. Handle 28 includes an "on-off" button 120 for activating the spit portion of the system. The handle also includes a power indicator light 122 for indicating that the system is "on," as well as an infrared light 124. The temperature readings obtained by the temperature sensor at one of hollow fork fingers (not shown) are transmitted through spit shaft 36 to handle 28. The temperature signals are then transformed into infrared signals that are transmitted by infrared light 124 to infrared sensor 126 on remote temperature monitor 30.

Figure 12:
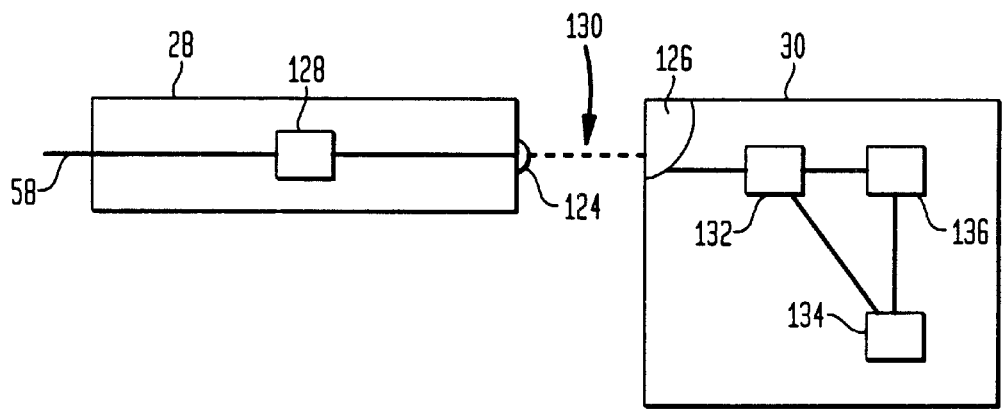
FIG. 12 shows a schematic diagram of the handle and remote temperature monitor of FIG. 11.

FIG. 12 shows a schematic diagram of the handle 28 and the remote temperature monitor 30. The handle 28 includes microprocessor 128 that obtains temperature signals through line 58. The temperature signals are then transformed at microprocessor 128 to generate infrared signals emitted from infrared light 124. The infrared signals pass through space 130 between handle 28 and remote temperature monitor 30. The remote temperature monitor 30 includes infrared sensor 126 in communication with second microprocessor 132. The second microprocessor 132 is preferably in communication with display screen (not shown) and noise generating element 134. Microprocessor 132 is also in communication with memory 136 that stores temperature range data for various types of meat as well as doneness data for the various types of meat. For example, the memory may store temperature cooking data for various types of meat such as beef, pork and poultry. The memory may also store temperature ranges for specific taste preference doneness levels for each of the types of meat. Specifically, the memory device 136 may include temperature ranges for cooking beef to rare, medium rare, medium and well done doneness levels.

Referring to FIGS. 11 and 12, in operation, a user will skewer one or more pieces of meat on spit shaft 136. The spit will preferably be placed in an oven, barbecue grill or other cooking instrument for cooking the meat. As the spit shaft rotates, temperature readings obtained through hollow fork fingers are transmitted from the sensor ring to the contact on the shaft, and then through shaft 36 to handle 28. In handle 28, the temperature readings are transformed by microprocessor 128 into infrared signals that are transmitted from infrared light 124 to infrared sensor 126. The infrared signals obtained by infrared sensor 126 are transmitted to second microprocessor 132. Depending upon the type of meat and taste preference selected, and the information obtained from memory device 136, the microprocessor will activate the various display indicators on visual panel 98. The microprocessor may also send a signal to noise generating unit 134 to generate an audible signal such as a beep or alarm.

Figure 13:
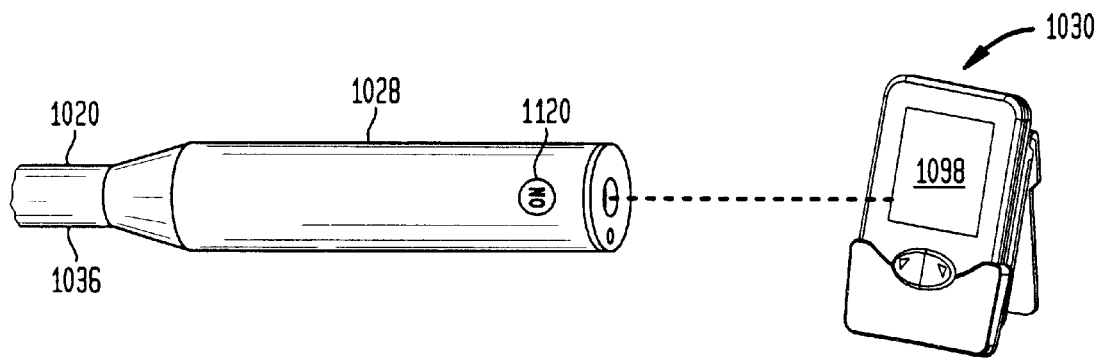
FIG. 13 shows a fragmentary view of the rotisserie system of FIG. 1 including a handle and a remote temperature monitor having an RF receiver.
Figure 14:
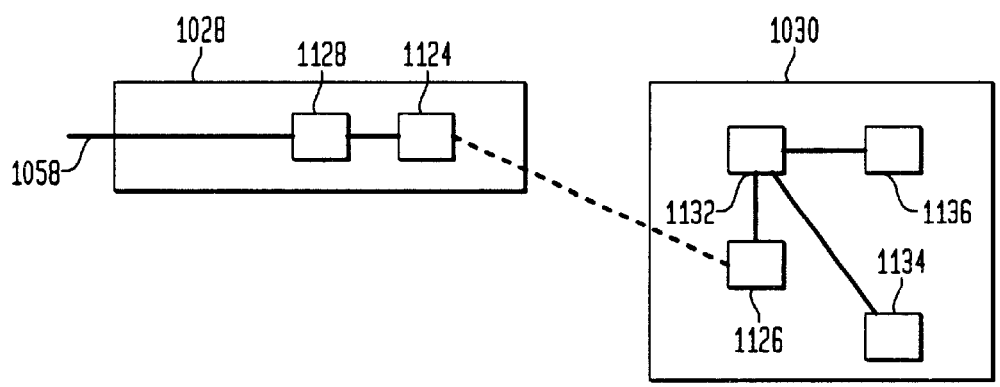
FIG. 14 shows a schematic diagram of the handle and remote temperature monitor of FIG. 13.

FIGS. 13 and 14 show another embodiment of the present invention whereby the temperature signals are transmitted between the handle 1028 and the remote temperature monitoring unit 1030 by radio frequency (RF) waves. In this particular embodiment, spit 1020 includes shaft 1036 having handle 1028. The handle 1028 includes an "on-off" switch 1120. The "on-off" switch may be depressed for activating or deactivating the spit 1020. Upon obtaining temperature readings, the temperature readings are transmitted via radio frequency between handle 1020 and remote temperature monitor 1030. FIG. 14 shows a schematic diagram of the handle 1028 and remote temperature monitor 1030 of FIG. 13. Handle 1028 includes microprocessor 1128 connected with temperature communication line 1058. As described above, temperature readings obtained by one of the hollow fork fingers of sensor ring (not shown) are transmitted through temperature communication line 1058 to first microprocessor 1128. The temperature signals are then transmitted to radio frequency transmitter 1124 which wirelessly transmits the temperature signals to radio frequency receiver 1126 of remote temperature monitor 1030. The temperature readings obtained at radio frequency receiver 1126 are transmitted to second microprocessor 1132. The second microprocessor 1132 compares the temperature readings to the various temperature ranges stored in memory device 1136. Depending upon the particular type of meat selected, the microprocessor will obtain the doneness levels for the particular type of meat. If an appropriate doneness level has been attained, the microprocessor 1132 will generate signals for display on visual display 1098 and/or noise generating unit 1134 for generating an alarm signal or beep.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A rotisserie system comprising:
   a rotatable spit adapted to secure meat, said rotatable spit including a temperature sensor for recording a temperature of said meat and a wireless transmitter for wirelessly transmitting the temperature; and
   a remote temperature monitor including a wireless receiver for receiving the wirelessly transmitted temperature and a visual display for displaying the temperature, wherein said remote temperature monitor is movable away from said rotatable spit while remaining in wireless communication with said wireless transmitter.

2. The system as claimed in claim 1, wherein said wireless transmitter is an infrared transmitter and said wireless receiver is an infrared receiver.

3. The system as claimed in claim 1, wherein said wireless transmitter is a radio frequency transmitter and said wireless receiver is a radio frequency receiver.

4. The system as claimed in claim 1, wherein said rotatable spit has a pointed end, a handle end, a shaft extending between said pointed end and said handle end and one or more contacts accessible at an outer surface of said shaft.

5. The system as claimed in claim 4, further comprising a sensor ring securable over said spit shaft, said sensor ring including a contact plate engagable with the one or more contacts of said spit shaft for forming an electrical interconnection between said sensor ring and said spit shaft.

6. The system as claimed in claim 5, wherein said sensor ring includes two or more fork fingers, and wherein one of said two or more fork fingers includes said temperature sensor.

7. The system as claimed in claim 6, further comprising a conductive line having a first end connected to said temperature sensor and a second end connected to said contact plate.

8. The system as claimed in claim 6, wherein said temperature sensor is a thermistor.

9. The system as claimed in claim 4, wherein said one or more contacts accessible at the outer surface of said spit shaft comprise a plurality of spaced contacts.

10. The system as claimed in claim 9, wherein said plurality of spaced contacts are evenly spaced from one another along said spit shaft.

11. The system as claimed in claim 1, wherein said sensor ring includes a rotatable locking screw adapted for locking said sensor ring in place at a selected location along said spit shaft.

12. The system as claimed in claim 1, wherein said spit is adapted for continuously rotating in a single direction while wirelessly transmitting the recorded temperature of said meat to said remote temperature monitor.

13. The system as claimed in claim 1, wherein said remote temperature monitor includes data entry keys for selecting one of a plurality of meats for temperature monitoring and a visual display for displaying cooking information related to the temperature reading received by said wireless receiver.

14. The system as claimed in claim 13, wherein said remote temperature monitor includes a memory for storing cooking data on said plurality of meats and doneness temperature ranges associated with each of said plurality of meats.

15. The system as claimed in claim 14, wherein said doneness temperature ranges are selected from the group consisting of well, medium, medium rare and rare.

16. A rotisserie system comprising:
    a rotatable spit including a shaft having an outer surface and a plurality of spaced contact pads accessible at the outer surface of said shaft; and
    a sensor ring including two or more fork fingers projecting therefrom, a temperature sensor in one of said fork fingers, and a contact plate in communication with said temperature sensor, wherein said sensor ring is securable on said shaft in engagement with one of said contact pads so that said contact plate of said sensor ring is in electrical contact with the one of said contact pads.

17. The system as claimed in claim 16, wherein said sensor ring includes a locking screw for selectively locking said sensor ring to said shaft.

18. The system as claimed in claim 16, wherein said rotatable spit includes a wireless transmitter in communication with said plurality of spaced contact pads for transmitting temperature readings obtained by said temperature sensor.

19. The system as claimed in claim 13, wherein said wireless transmitter is an infrared transmitter.

20. The system as claimed in claim 18, wherein said wireless transmitter is a radio frequency transmitter.

* * * * *

UNITED STATES PATENT AND TRADEMARK OFFICE
CERTIFICATE OF CORRECTION

PATENT NO. : 6,539,842 B1
DATED : April 1, 2003
INVENTOR(S) : Peter A. Chapman, Darren Keller and Hughes Sanoner It is certified that error appears in the above-identified patent and that said Letters Patent is hereby corrected as shown below:

<u>Column 2,</u>
Line 28, after "fingers" insert -- . --.
Line 28, delete "that are".
Line 28, "the" should read -- The --.

<u>Column 4,</u>
Line 42, "a" (second occurrence) should read -- an --.

Signed and Sealed this

Eighth Day of July, 2003

JAMES E. ROGAN
*Director of the United States Patent and Trademark Office*